Sept. 19, 1961 E. LONG ET AL 3,000,728
TANKS FOR HOLDING A COOLANT TO BE CIRCULATED
THROUGH A NUCLEAR REACTOR
Filed June 24, 1958 19 Sheets-Sheet 3

INVENTORS
EVERETT LONG
RONALD SCOTT CHALLENDER

BY Larson and Taylor

ATTORNEYS

Sept. 19, 1961  E. LONG ET AL  3,000,728
TANKS FOR HOLDING A COOLANT TO BE CIRCULATED
THROUGH A NUCLEAR REACTOR
Filed June 24, 1958  19 Sheets-Sheet 6
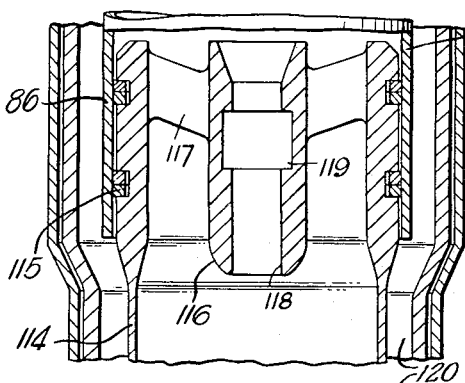
Fig. 8.
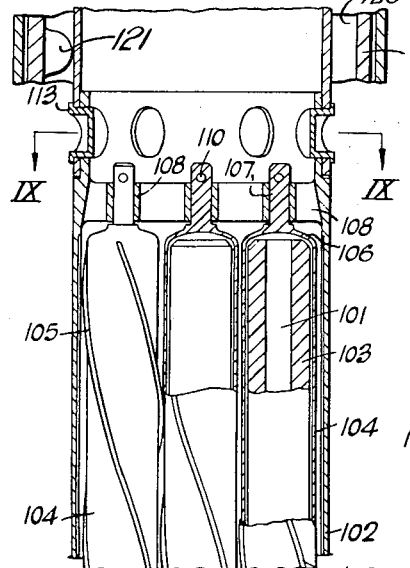
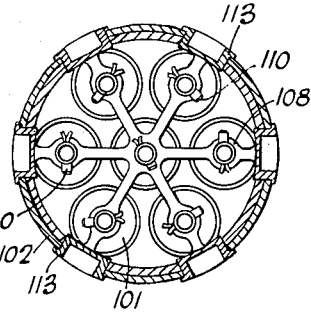
Fig. 9.
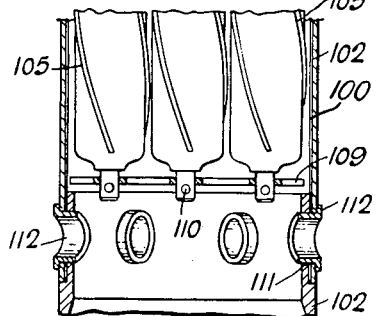
INVENTORS
EVERETT LONG
RONALD SCOTT CHALLENDER
BY Larson and Taylor
ATTORNEYS

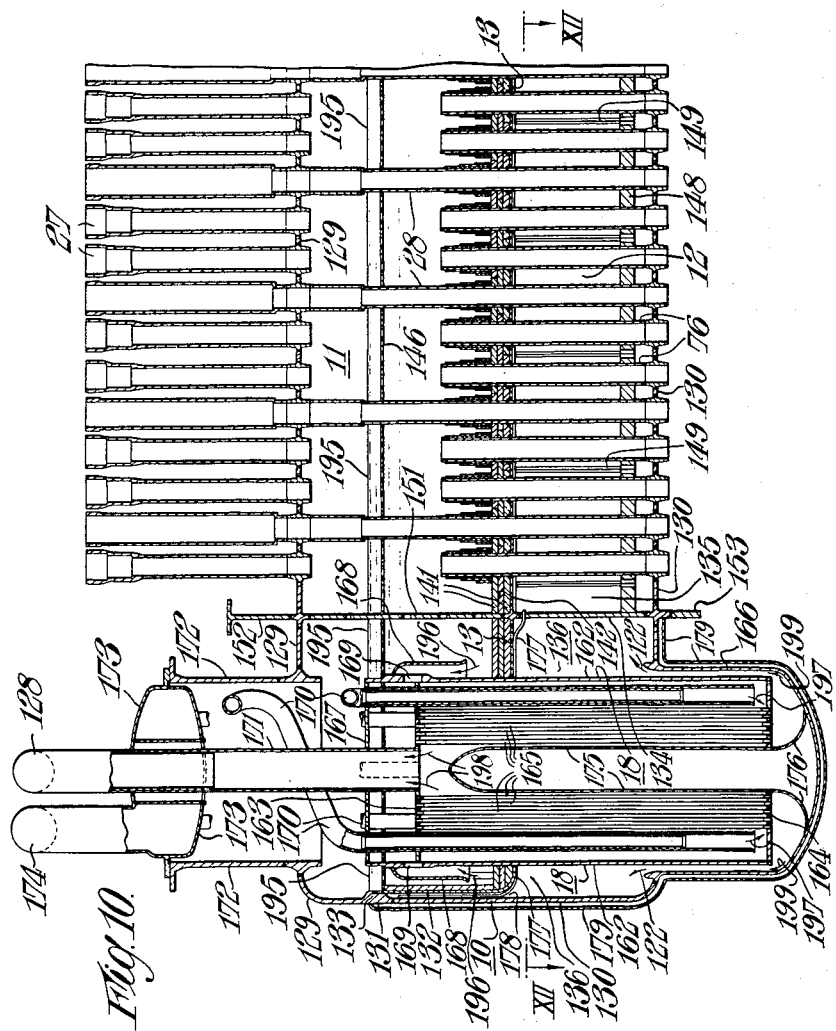

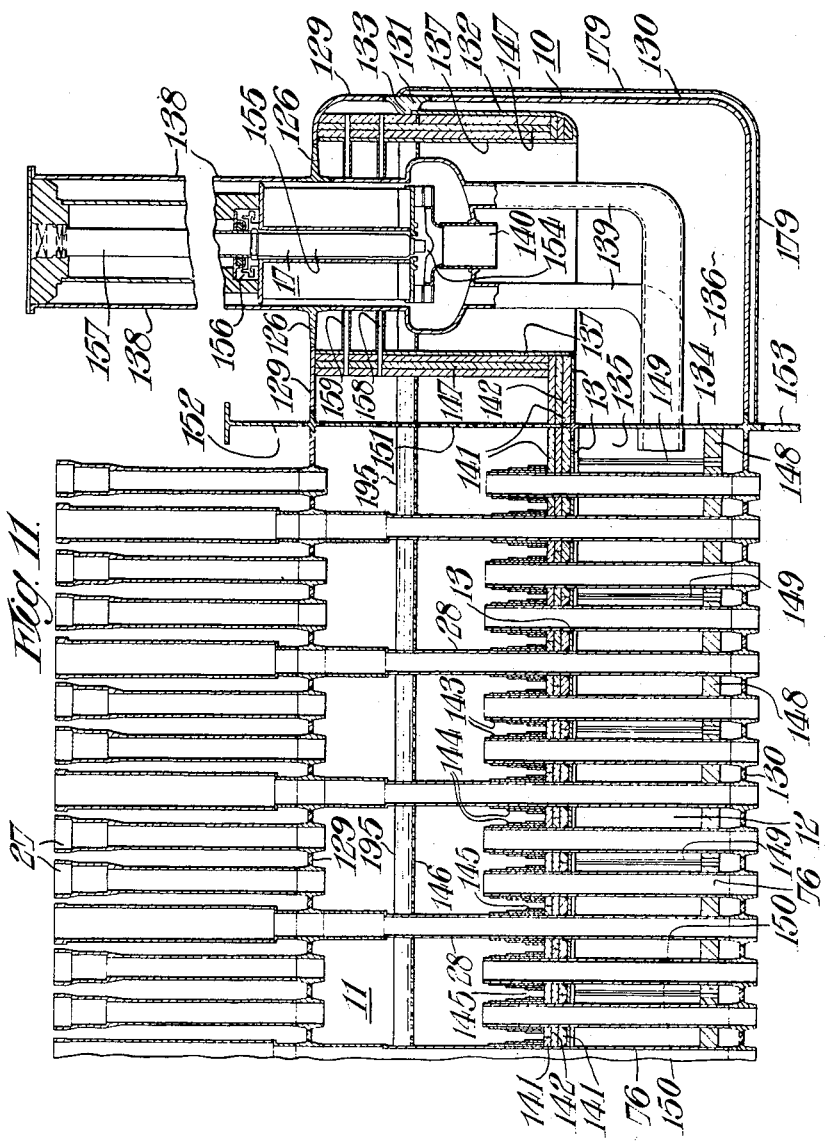

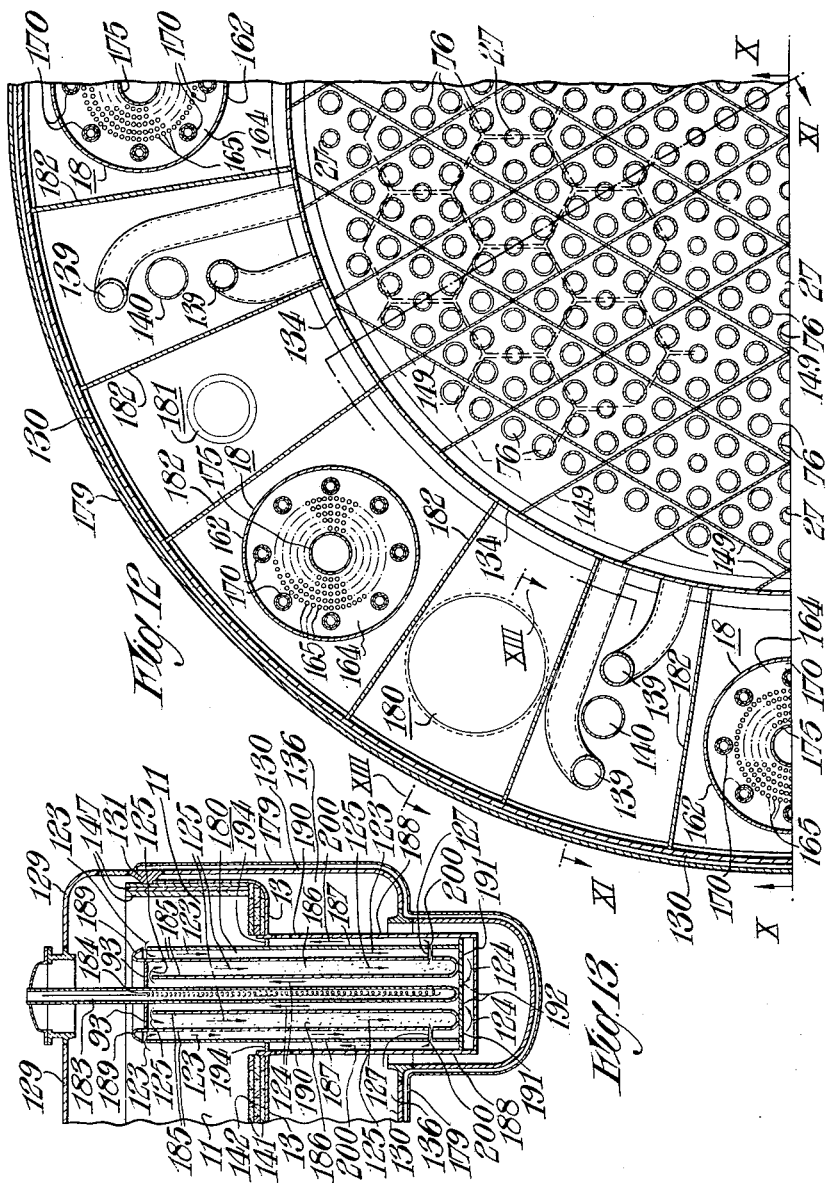

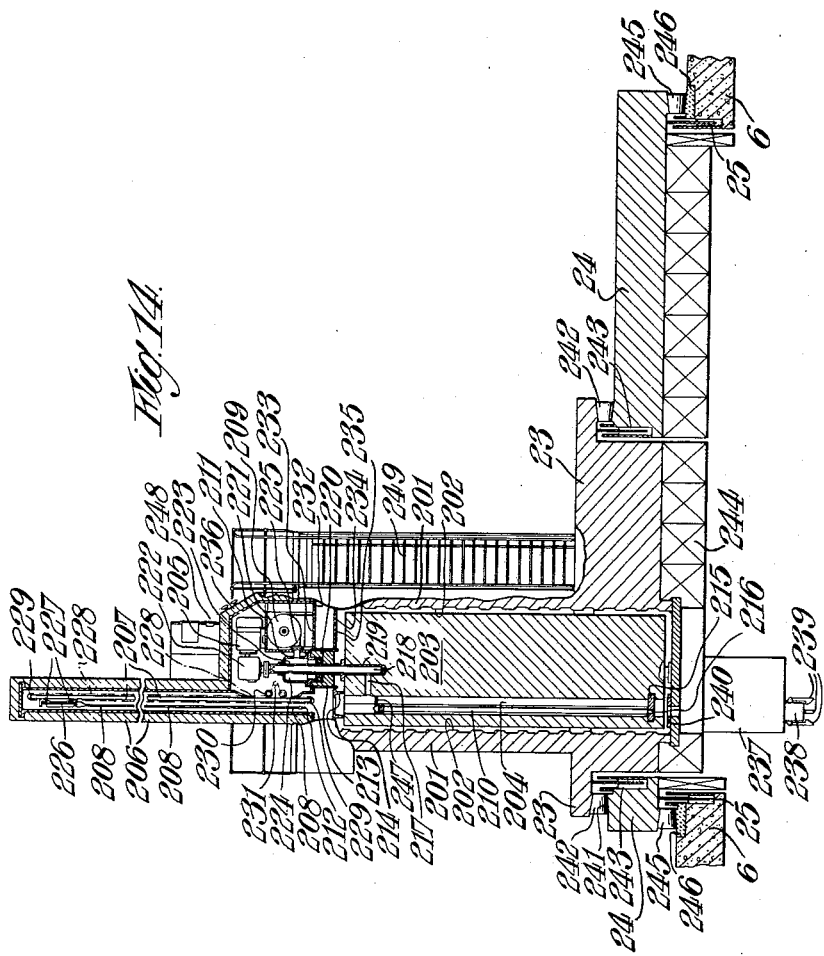

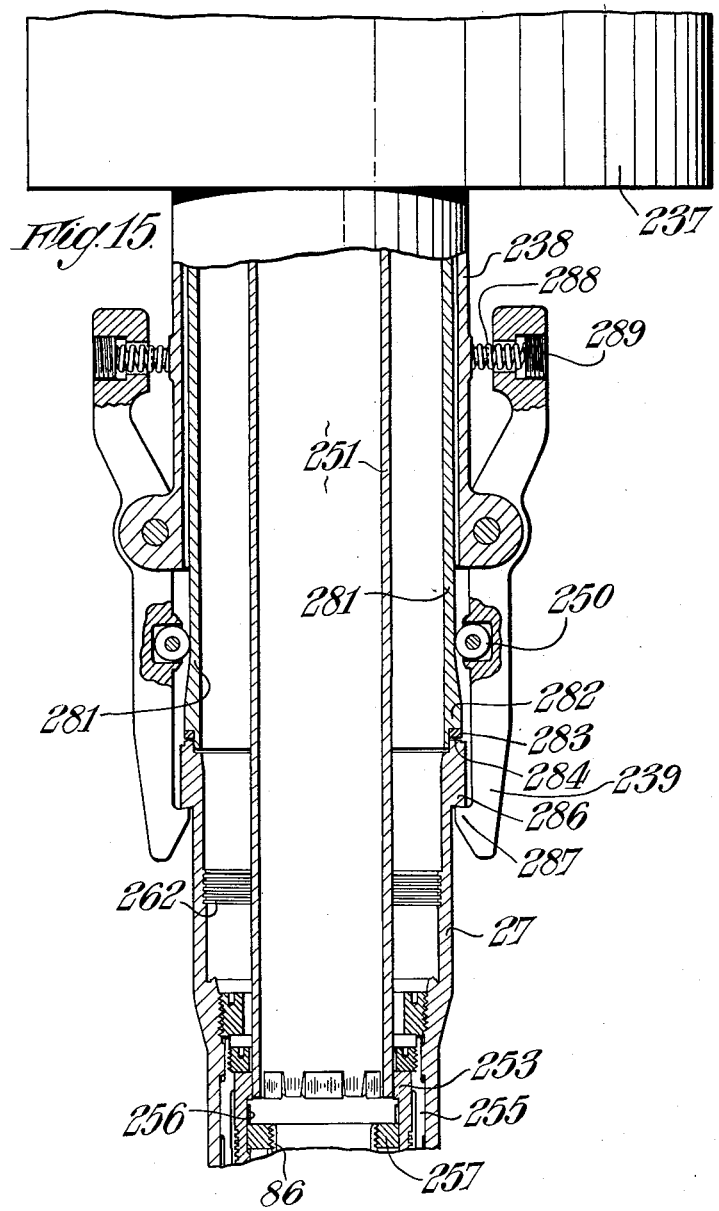

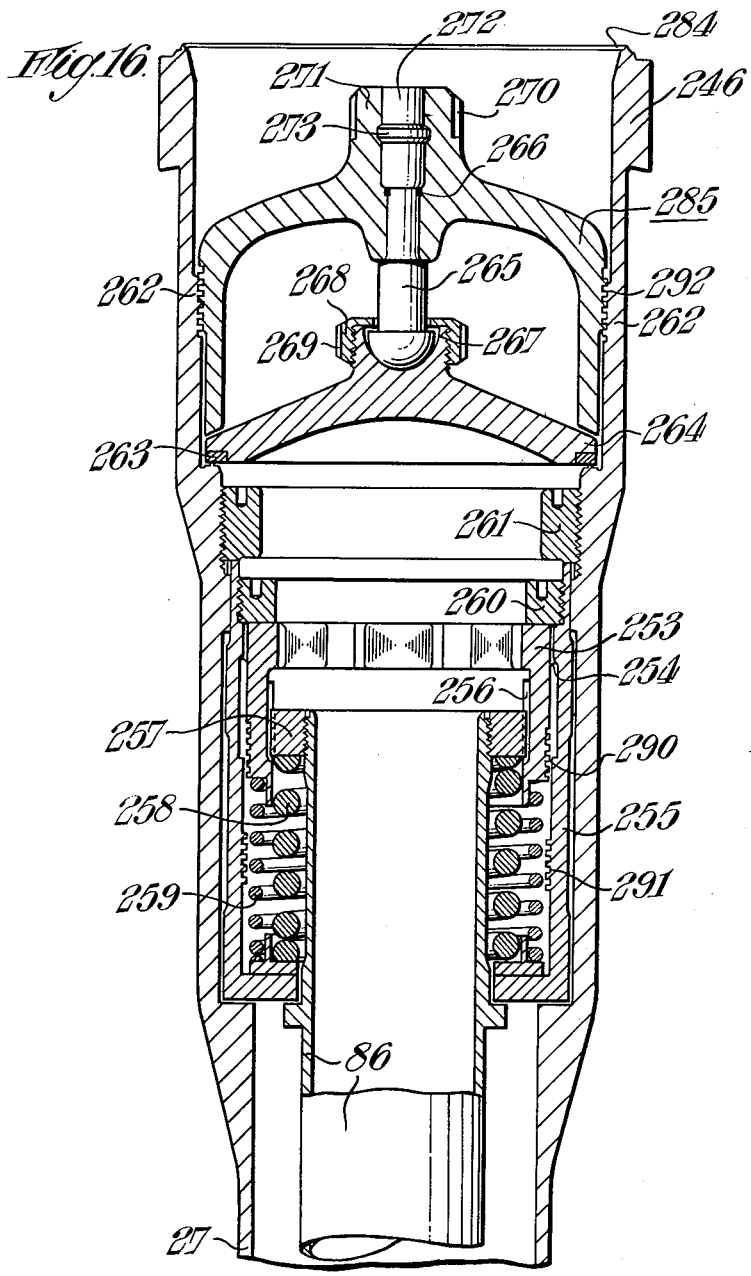

Sept. 19, 1961 E. LONG ET AL 3,000,728
TANKS FOR HOLDING A COOLANT TO BE CIRCULATED
THROUGH A NUCLEAR REACTOR
Filed June 24, 1958 19 Sheets-Sheet 13
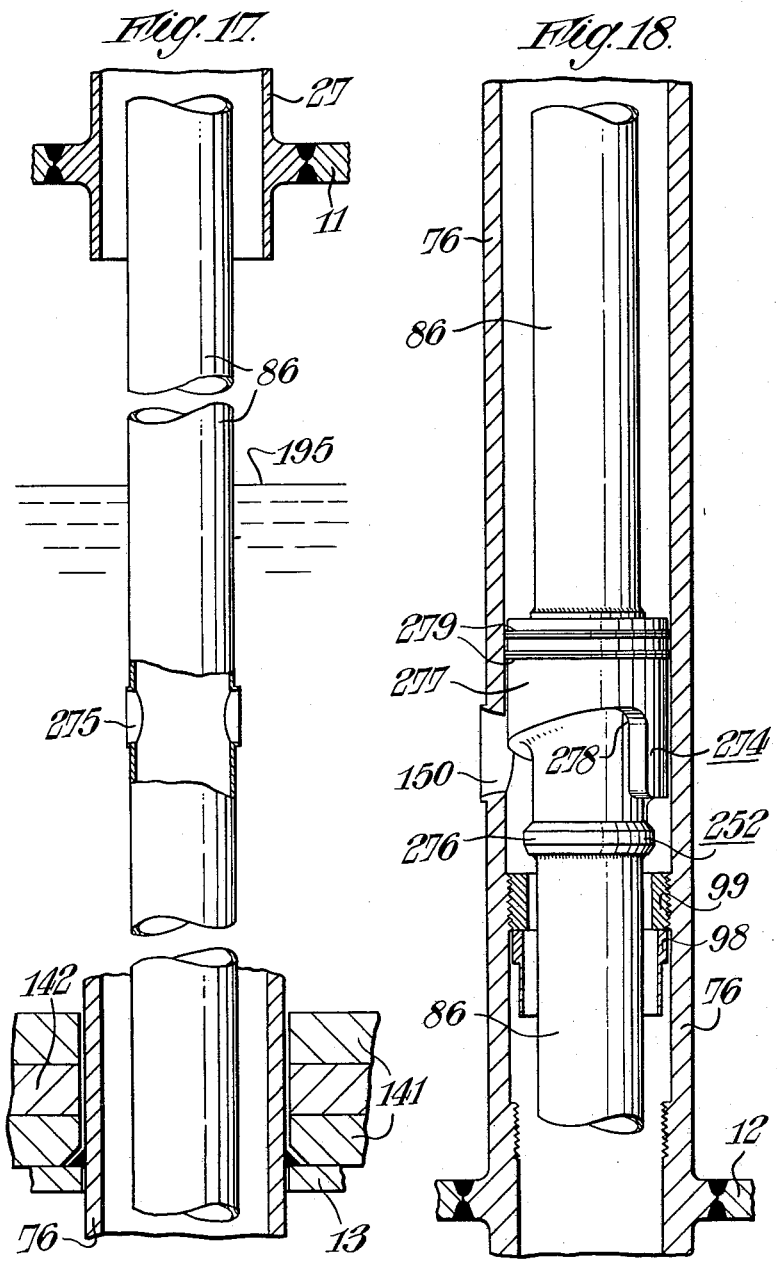
INVENTORS
EVERETT LONG
RONALD SCOTT CHALLENDER
BY Larson and Taylor
ATTORNEYS

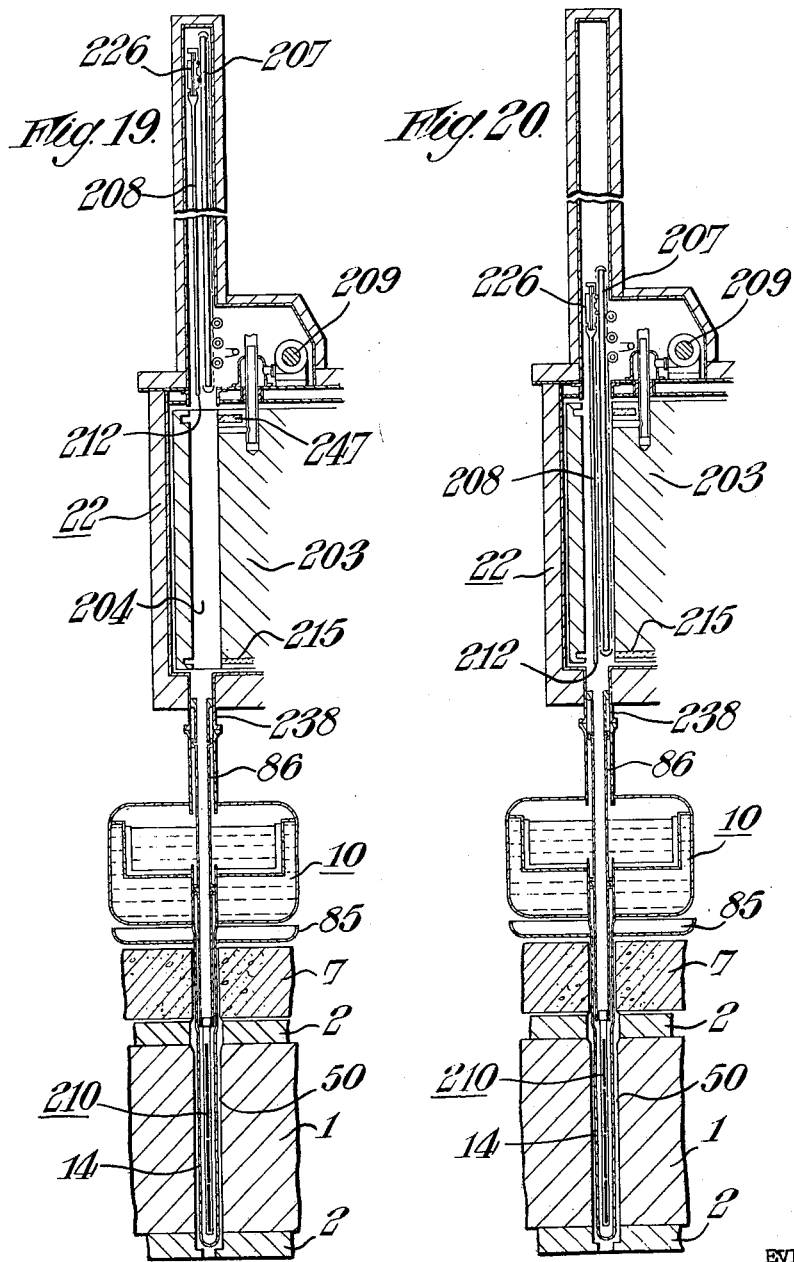

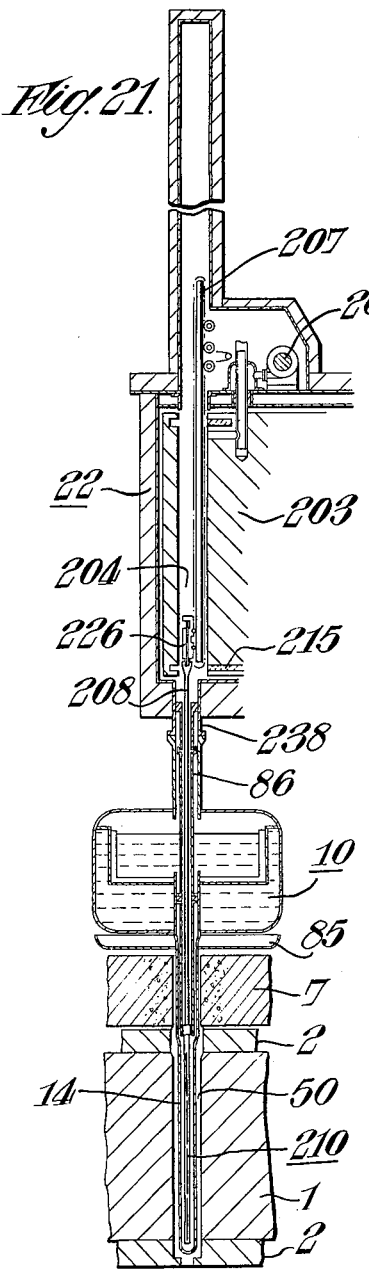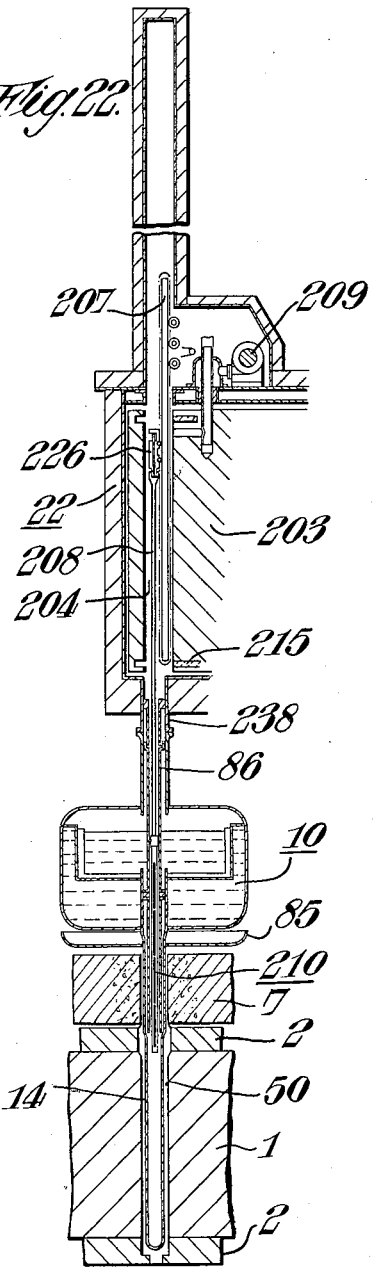

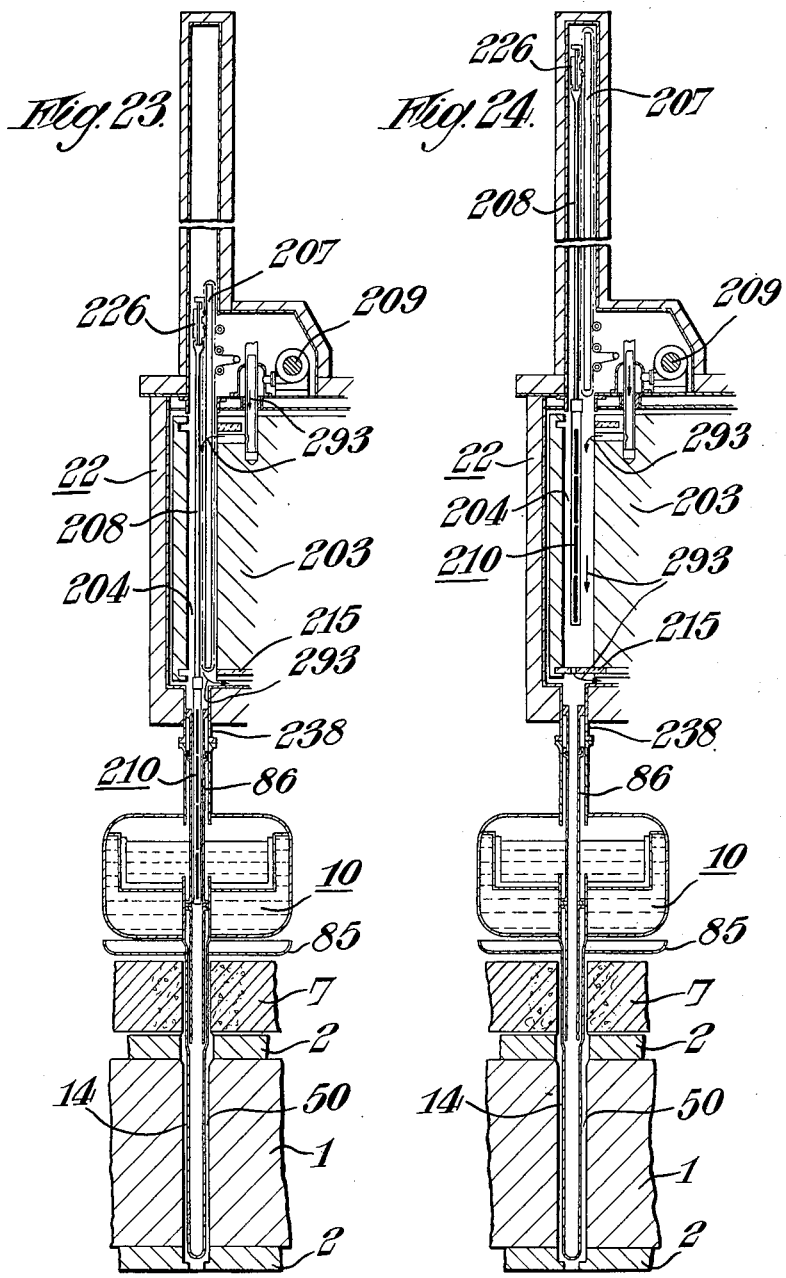

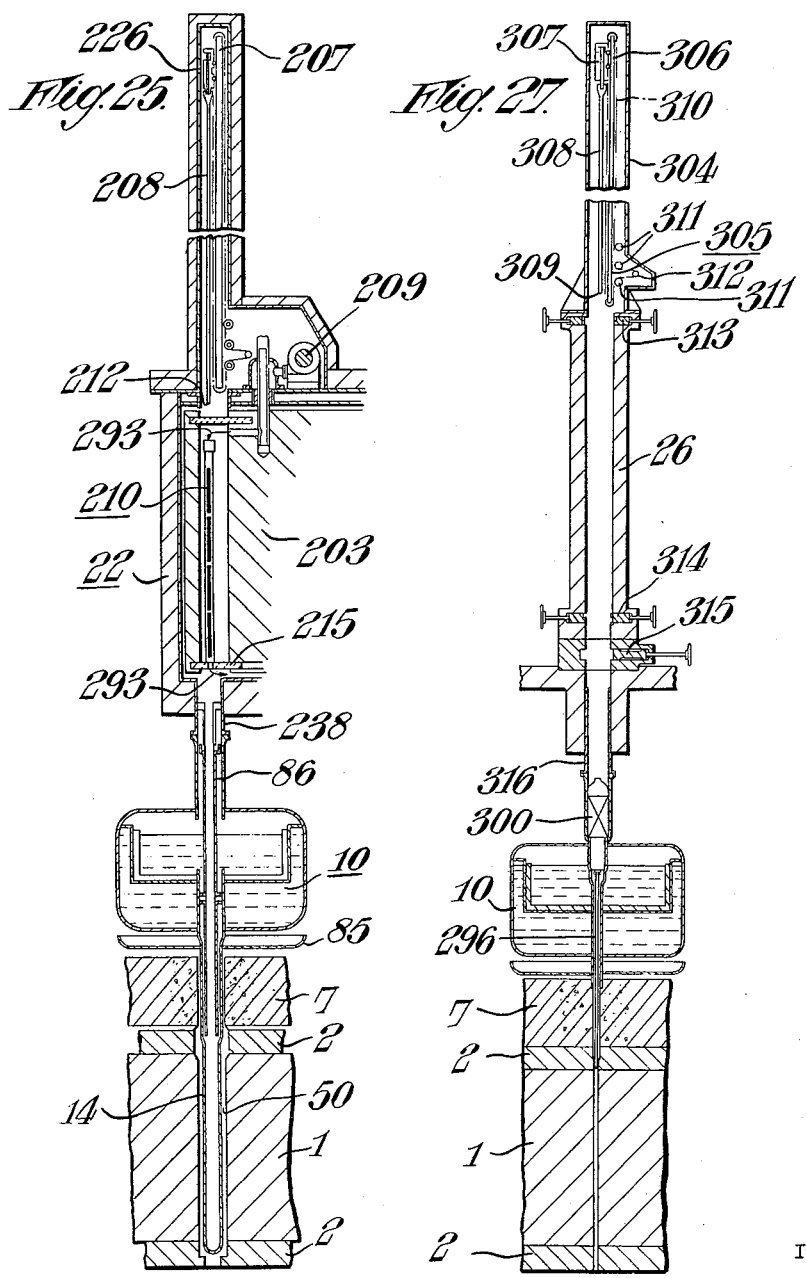

Sept. 19, 1961   E. LONG ET AL   3,000,728
TANKS FOR HOLDING A COOLANT TO BE CIRCULATED
THROUGH A NUCLEAR REACTOR
Filed June 24, 1958   19 Sheets-Sheet 18

INVENTORS
EVERETT LONG
RONALD SCOTT CHALLENDER
BY Larson and Taylor
ATTORNEYS

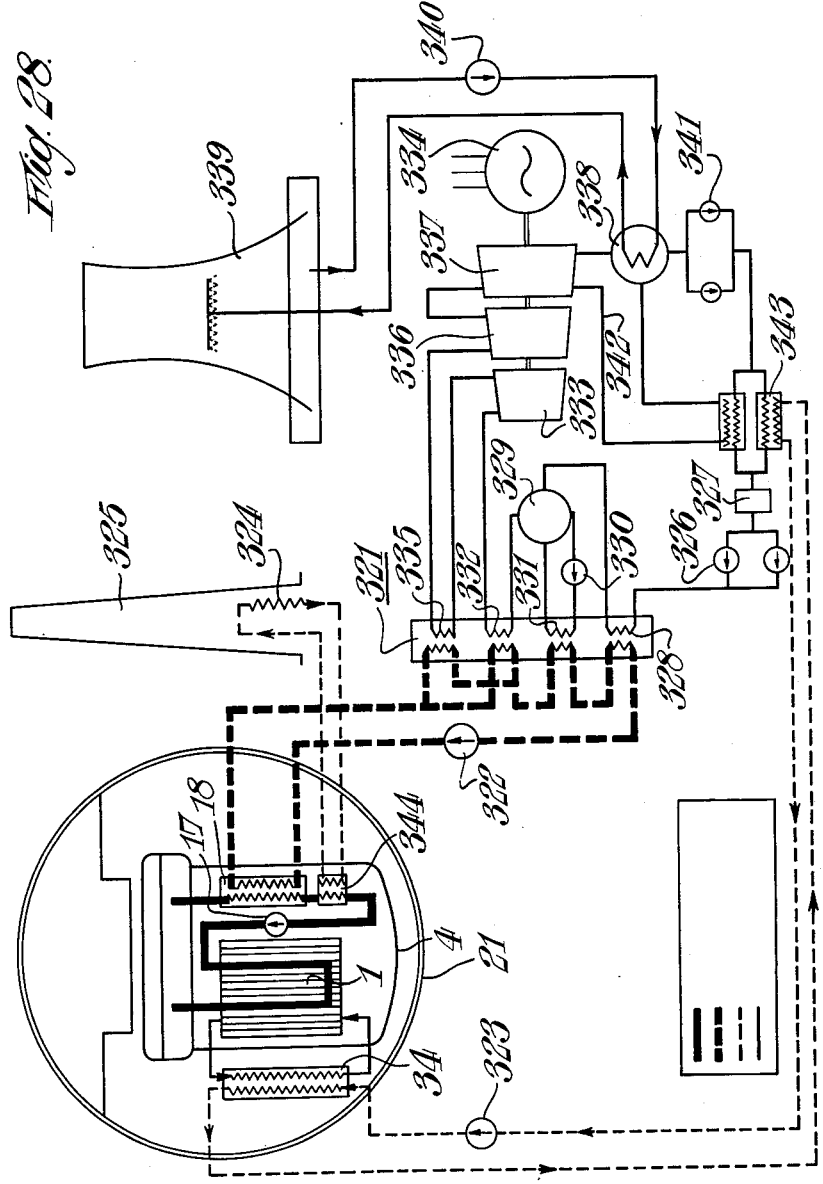

United States Patent Office 3,000,728
Patented Sept. 19, 1961

3,000,728
TANKS FOR HOLDING A COOLANT TO BE CIRCULATED THROUGH A NUCLEAR REACTOR
Everett Long, Culcheth, near Warrington, and Ronald Scott Challender, Appleton, near Warrington, England, assignors to United Kingdom Atomic Energy Authority, London, England
Filed June 24, 1958, Ser. No. 744,185
Claims priority, application Great Britain June 24, 1957
1 Claim. (Cl. 204—193.2)

This invention relates to nuclear reactors and it provides a compact assembly of components for use in combination with a heat removal system associated with a nuclear reactor. The application of the invention is in the design of liquid (such as sodium) cooling of a reactor wherein both inlet and outlet cooling liquids to and from the reactor are accommodated in tanks extending over the top face of the reactor whilst allowing access to the reactor for control rods and charge/discharge apparatus etc. via the same face.

According to the present invention a tank for inlet and outlet liquid coolant to and from a reactor is divided into upper and lower compartments by a horizontal diaphragm and the lower compartment is divided by a vertical diaphragm into a centre core part and an outer annular part, a pump supported in the tank providing pumping between the annular part and the core part, and a heat exchanger also supported in the tank providing heat exchange in the flow of fluid between the tank compartments.

By way of example a sodium-cooled, graphite-moderated nuclear reactor embodying the invention will now be described with reference to the accompanying drawings wherein:

FIG. 8 is a sectional elevation of a fuel element assembly.

FIG. 9 is a sectional view on the line IX—IX of FIG. 8.

FIG. 10 is a sectional view of the sodium header tank and a primary/secondary sodium heat exchanger (on the line X—X of FIG. 12).

FIG. 11 is a sectional view of the sodium header tank and a sodium pump (on the line XI—XI of FIG. 12).

FIG. 12 is a section on the line XII—XII of FIG. 10.

FIG. 13 is a section through a sodium hot trap on the line XIII—XIII of FIG. 12.

FIG. 14 is a sectional elevation of the servicing machine.

FIG. 15 is a sectional elevation of the connection between the servicing machine and the fuel element channels.

FIG. 16 and 18 are sectional elevations of the sodium inlet valve arrangement.

FIG. 17 is a sectional elevation showing the sodium outlet.

FIGS. 19 to 25 are diagrammatic sectional elevations showing the sequence of fuel element discharge operations.

FIG. 27 is a diagrammatic sectional elevation of the control rod coffin, and

FIG. 28 is a typical flow sheet for a sodium-graphite reactor producing electric power.

Figure 1:
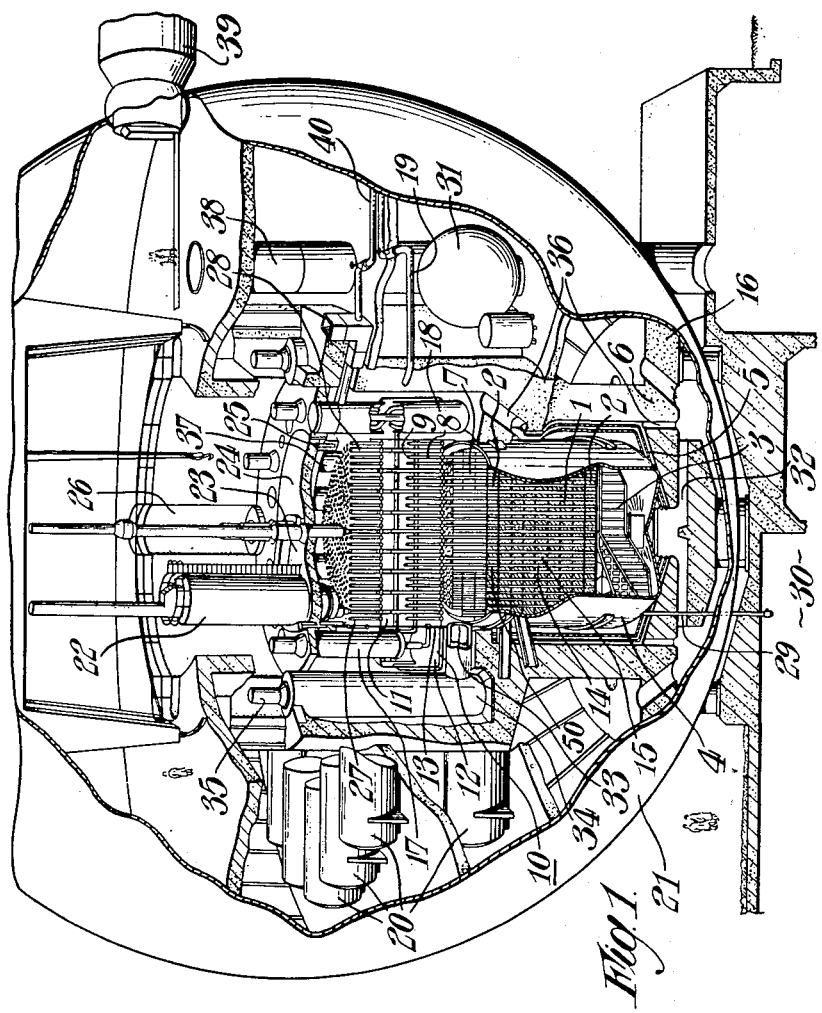
FIG. 1 is a cutaway perspective view of the whole reactor.

FIG. 1 shows a graphite-moderated reactor core 1 with a surrounding graphite reflector 2 supported on a grid 3 within a reactor vessel 4. The vessel 4 is surrounded by a thermal shield 5 and a biological radiation shield 6. Above the top reflector 2 and within the biological shield 6 are a neutron shield 7 and primary sodium inlet and outlet headers 8 and 9, respectively, situated in a circular tank 10 welded to the top of the vessel 4 so as to form the top cover of the vessel. The weight of the combined system is taken through the walls of the vessel 4 on to rocking supports 6 permitting free expansion of the tank 10 and transmitting the load to concrete structure 16. The tank 10 is divided into upper and lower tanks 11, 12 by a horizontal diaphragm 13. The upper tank 11 contains hot sodium (500° C.) and the lower tank 12 contains cool sodium (300° C.). The headers 8 connect with zirconium thimble tubes 14 in fuel element channels 50 in the reactor core 1 and the headers 9 with fuel element supporting tubes 15, inside the thimble tubes 14 and concentric with them. Pumps 17 and sodium/sodium heat exchangers 18 are supported in the tank 10. Pipes 19, 40 lead from the heat exchangers 18 to a secondary sodium circuit; sodium storage tanks 20 are provided outside the biological shield 6. For district safety the reactor core and primary sodium circuit are enclosed in a containment sphere 21. The neutron shield 7 protects the tank 10 from activation by neutron bombardment.

A servicing machine 22 for carrying out the various operations involved in the charging and discharging of fuel elements is mounted eccentrically on a rotatable wheel 23 forming part of a rotatable gamma shield 24 sealed to the biological shield 5 by mercury seals 25. The machine 22 and a control rod coffin 26 penetrate the wheel 23 and by suitable rotation of the wheel 23 and gamma shield 24 give access to the top face of the reactor core without violating any radiation shielding. The machine 22 connects with stand pipes 27 associated with the thimble tubes 15 and the coffin 26 with control rod tubes 28. A single fuel element discharge channel 29 passes between the reactor core 1 and side reflector 2 then through the shields 5, 6 and containment sphere 21 to an underground duct 30. At the charge face of the reactor the biological shield 6 is extended horizontally to the wall of the sphere 21 and welded to it so as to form a hermetic seal. That volume of the sphere 21 which is below the extended shield 6 and rotatable shield 24 is filled with nitrogen which is supplied from a nitrogen plant 31 and circulates over the reactor vessel 4, between the two layers of the thermal shield 5 and through ducts 32, 36 in the biological shield 6 by natural convection. The plant 31 also supplies nitrogen for cooling the moderator in the reactor core 1 by upward flow through the core 1. The nitrogen collects in a gas space 33 between the tank 10 and neutron shield 7 and is circulated through a heat exchanger 34 by a blower 35. A further gas space 37 exists between the tank 10 and the gamma shield 23. This ensures that between the primary sodium and the operating personnel there are always two solid barriers and an intervening inert gas atmosphere. Access to the lower part of the sphere 21 is through a well 38 and access to the upper part from the outside atmosphere through an air lock 39.

The reactor components will now be described in greater detail under appropriate headings.

Figure 2:
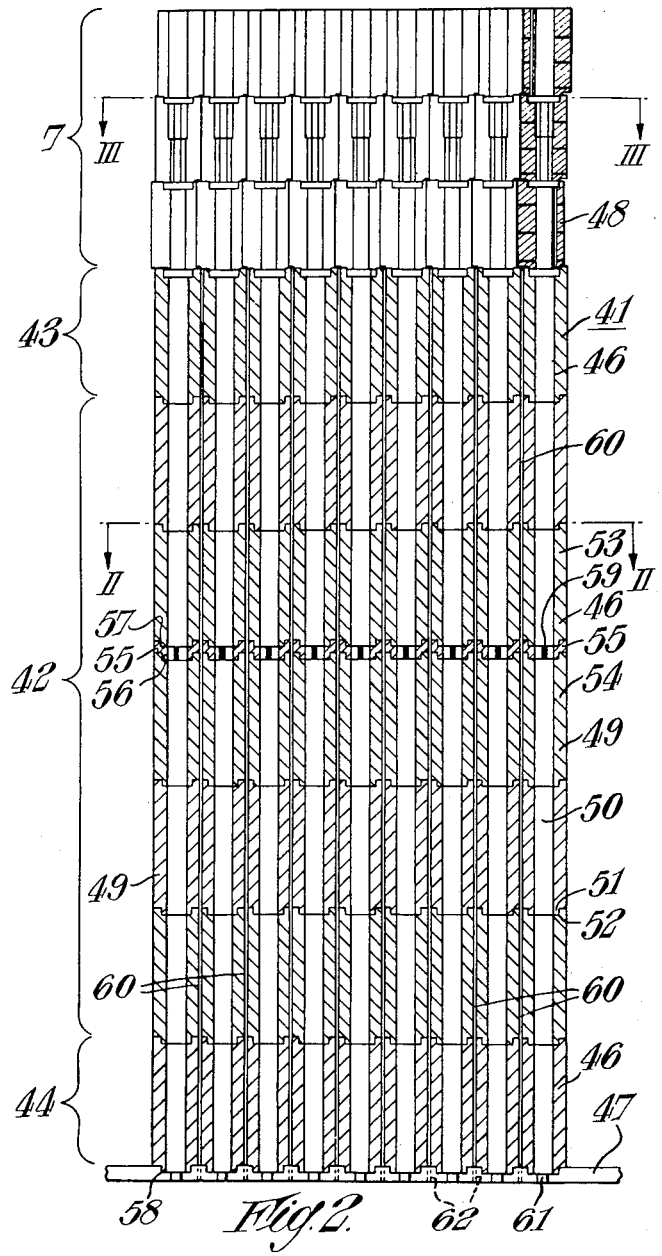
FIG. 2 is a vertical sectional elevation of the moderator structure.

The moderator structure of the core 1, the reflector 2, the neutron shield 7, and the reactor channel arrangement In FIG. 2 there is shown in general outline part of the moderator structure 41 of the core 1 and reflector 2 comprising a core region 42 and upper and lower reflector regions 43 and 44 surmounted by the neutron shield 7. The upper and lower reflector regions 43 and 44 each comprises a layer of spaced hexagonal cross section graphite blocks 46, the blocks 46 of the lower reflector region 44 resting on a perforated core plate 47. The core region 42 comprises a further six layers of graphite bricks 46 and the neutron shield 7 comprises three layers of steel canned graphite bricks 48 of hexagonal cross section. The blocks 46 form vertical columns 49 and are drilled to define the vertical channels 50 passing through the structure 41. The layers of blocks 46 forming the structure 41 are spigotted together, spigots 51 formed on the blocks 46 of any layer engaging with spigot holes 52 in the blocks 46 of lower adjacent layers, excepting two central layers 53 and 54 of blocks 46 which are separated by a layer of spaced hexagonal tiles 55 having spigots 56 and spigot holes 57 respectively similar to the spigots 51 and the spigot holes 52 of the blocks 46. The spigots 51 of the blocks 46 forming the lower reflector region 44 engage with spigot holes 58 formed in the core plate 47. The tiles 55 are drilled to preserve the continuity of the channels 50 and have three equally spaced internal projections 49.

Figure 3:
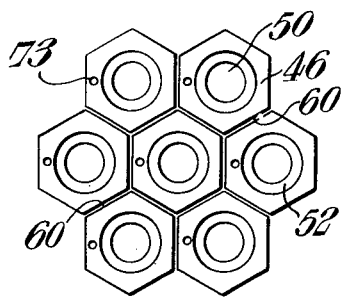
FIG. 3 is a sectional plan along the line II—II of FIG. 2.

As shown in FIG. 3 the blocks 46 of the core region 42 and the upper and lower reflector regions 43 and 44 are spaced apart face to face thus defining vertical passageways 60 through the structure 41. The core plate 47 has drillings 61 connecting with the channels 50 and drillings 62 connecting with the passageways 60.

Figure 4:
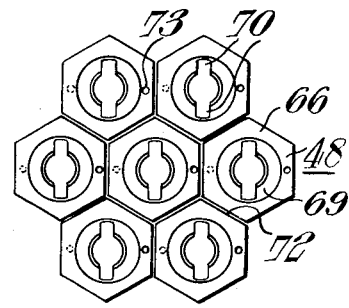
FIG. 4 is a section plan along the line III—III of FIG. 2.
Figure 5:
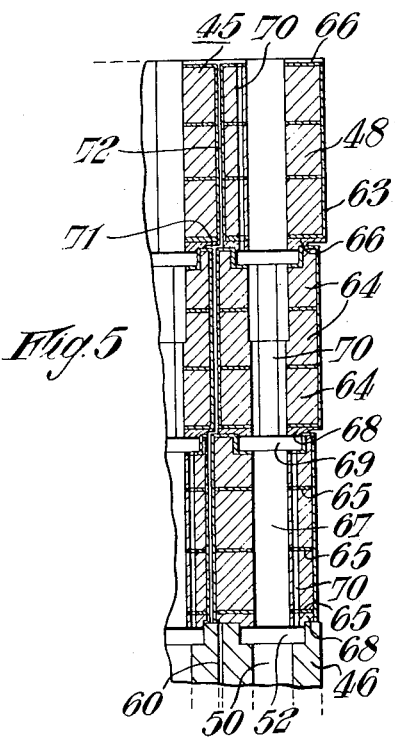
FIG. 5 is an enlarged detail of a neutron shield forming part of the structure of FIG. 2.

Referring to FIGS. 4 and 5 in conjunction with FIG. 2, the neutron shield 7 is formed from composite steel canned graphite bricks 48. The bricks 48 comprise a hexagonal mild steel can 63 containing three sections of graphite 64 separated by boron steel shims 65. The can 63 is closed top and bottom by boron steel end plates 66. The neutron shield 7 is built up from three layers of the bricks 48, each layer being staggered in relationship to lower layers. The bricks 48 are drilled to define extensions 67 of the channels 50 but of smaller diameter. The bricks 48 have short spigots 68 engaging with spigot holes 69 in the bricks 48 of adjacent lower layers while the spigots 68 of the bottom layer of bricks 48 engage with the spigot holes 52 in the bricks 46 of the upper reflector region 43. Each of the bricks 48 has two diametrically opposed internal longitudinal chases 70 (see FIG. 4) and the radial position of the chases 70 is staggered by 60° in consecutive layers of the bricks 48 to obviate vertical gaps in the neutron shield 7. As shown in FIGS. 4 and 5 the bricks 48 are spaced apart face to face thus defining with cut away parts 71 of the bricks 48, staggered passageway 72 through the neutron shield 7 connecting with the passageways 59. The bricks 46 are additionally coupled together by pegs 73.

Figure 6:
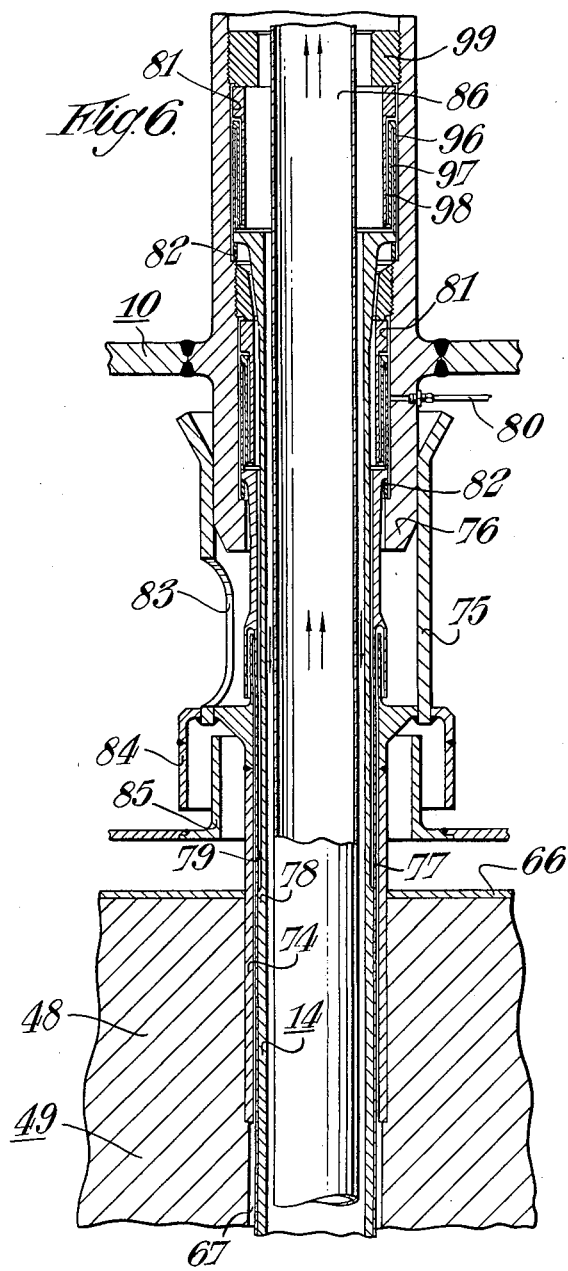
FIG. 6 is a sectional elevation of the top of a reactor channel.
Figure 7:
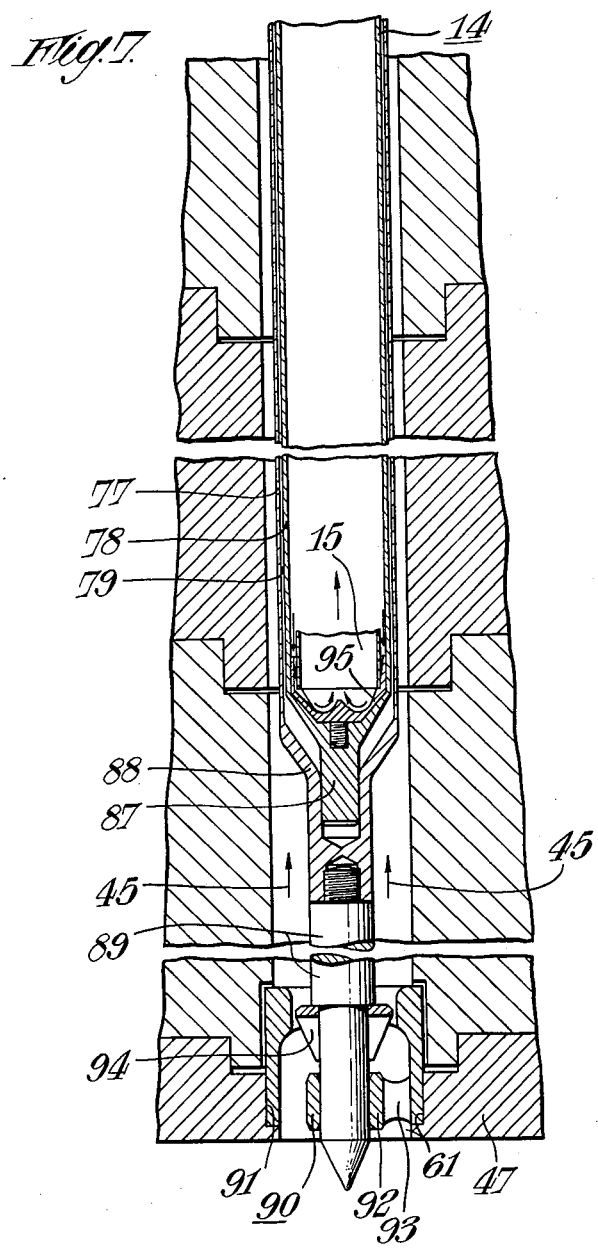
FIG. 7 is a sectional elevation of the bottom of a reactor channel.

As shown in FIG. 6 each column 49 of graphite blocks (46 and 48) is located by a flanged mild steel spigot tube 74 joined by an intermediate flanged sleeve 75 to a mild steel stub pipe 76 projecting from the underside of the tank 10. The zirconium thimble tubes 14 pass through the channels 50 and their extensions 67, and are intermediately located in the channels 50 by the projections 59 of the tubes 55. The thimble tubes have double walls 77, 78 with a space 79 between them connected with a leak detector pipe 80. The wall 77 is a thin skin over the wall 78. The upper ends of the tubes 14 are sealed in the stub pipes 76 by means of temperature compensated mechanical joints 81 each comprising a sealing ring 82 and a nest of flanged tubes 96, 97, 98 each bearing on the tube below and locked in position by a nut 99. The sealing ring 82 and outermost tube 96 are of nickel alloy having a linear thermal expansion intermediate between that of mild steel and zirconium, the middle tube 97 is of mild steel and the innermost tube 98 of nickel alloy having a linear thermal expansion approximately equal to that of mild steel. Any sodium leaking from the joint 81 flows down the wall 77, through perforations 83 in the sleeve 75 then over a hood 84 which, with a leak tray 85 extending across the top of the neutron shield 7 prevents sodium reaching the moderator structure 41. (A connection to a drain tank is provided.) A steel tube 86 inside each thimble tube 14 passes into the upper tank 11 where it is fitted with a sodium inlet valve 252 (see FIG. 18) and at its lower end connects with the fuel element supporting tube 15 (see FIG. 8). The lower end of the tube 15 rests on a finned member 95 spigotted into the closed end 87 of the inner wall 78 of the thimble tube 14. The end 87 is in turn spigotted into the closed end 88 of the outer wall 77. A peg 89 is screwed into the closed end 88 and engages spiders 90 carried by the core plate 47 within the drillings 61. Each of the spiders 90 comprises a cylindrical body 91 fitted into one drilling 61 of the core plate 47 with a central boss 92 located by three integral spider legs 93. The peg 89 is fitted with a flow restrictor 94 in the form of a tapered ring. In operation of the reactor, gaseous coolant for the graphite (as indicated by arrows 45) is fed through the drillings 61 in the core plate 47, through the annular spaces between the walls of the channels 50 and the thimble tubes 14, through the chases 70 and thence through the perforations 83 in the sleeve 75 into the gas space 33. Gaseous coolant is also fed through the passageways 60 and thence out of the structure 41 into the gas space 33 through the staggered passageways 72 in the neutron shield 7.

The direction of minimum Wigner growth of the graphite in the graphite blocks 46 is arranged longitudinally thereof and the passageways 60 and 72 are made of sufficient width to accommodate lateral Wigner growth whilst still allowing the passage of a coolant.

Differential thermal movements between the sodium tank 10 and the core plate 47 is accommodated by tilting of the columns 9 which can be tolerated.

The fuel element assembly

In FIGS. 8 and 9 clusters of seven fuel element rods 101 are housed in double-walled zirconium sleeves 102, with a gas space 100 between the walls, stacked one upon another to form the tube 15. The rods 101 comprise uranium tubes 103 in protective stainless steel sheaths 104 with helical fins 105 and welded end caps 106. The end caps 106 carry plugs 107 which serve to support the fuel rods 101 in spiders 108 and locate them at their lower ends in spiders 109. The spiders 108 are attached to the sleeves 102 and the spiders 109 are a loose fit in the sleeves. Split pins 110 fix the fuel rods 101 in the spiders 108, 109.

The sleeves 102 have perforations 111 and are joined together by tubular pins 112 passing through and expanded into perforations 111 in adjacent sleeves 102. The top perforations 111 are blocked off by connecting pins 113 which connect the top sleeve 102 with a tube 114 (also part of the tube 15) having piston rings 115 to seal with the mild steel tube 86 and carrying a boss 116 on webs 117. The boss 116 has a central bore 118 with a recessed part 119 which can accommodate an expandible tool for lifting the fuel element assembly. The sleeves 102, 114 are located in the thimble tubes 14 by dimples 121.

In operation the fuel element rods 101 are assembled in the sleeves 102 which are coupled together by the pins 112 and attached to the tube 114 by pins 113. The assembly is loaded into the reactor inside the thimble tubes 14 so as to leave an annular space 120 between the sleeves 102 and the walls 78 of the tubes 14. Coolant sodium is fed into the annular space 120 from the lower tank 12 and flows down through the reactor, most of the sodium making a complete path along the outside of the sleeves 102 and up the inside of the sleeves 102 over the fuel rods 101. The double walls of the sleeves 102 with the insulating gas space 100 between them reduce heat transfer between the cool flow down the annular space 120 and heated flow over the fuel element rods 101. Some of the sodium coolant short circuits the complete coolant flow path by flowing through the perforations defined by the pins 112. This short circuit flow decreases the pressure loss which would be experienced compared with all the sodium flowing over the complete path without degrading the temperature of the coolant leaving the fuel elements by the tubes 114, 86.

The fuel element assembly may at any time be removed from the reactor and dismantled by contracting and taking out the tubular pins 112 and the connecting pins 113. The stack may then be reassembled so that the portions previously in the top half of the reactor will be in the bottom half on reloading, the central portions being moved to the outside to even out the irradiation received overall. By breaking off the tube 15 and sealing it in the continuing tube 86 it is possible to replace the tube 15 should it become excessively corroded by hot sodium during the lifetime of the fuel element rods 101 without replacing the tube 86. Also, since the tube 86 is not within the reactor core its neutron absorption is not critical and it may be made of mild steel which is much cheaper than zirconium.

*The sodium header tank 10, sodium pump 17, heat exchanger 18 and sodium hot trap*

The sodium header tank 10 comprising the upper tank 11 and lower tank 12 is shown in detail in FIGS. 10, 11, 12 and 13 with the sodium pump 17 sodium/sodium heat exchanger 18, and sodium hot trap 180.

The upper tank 11 has a body 129 and the lower tank 12 has a body 130, the bodies 129, 130 being joined by a forged sectional ring 131. The diaphragm 13 is of dished shape having a vertical side wall 132 which is seam welded to an internal flange 133 of the forged ring 131. The stub pipes 76 (continuations of the thimble tubes 14 (FIGS. 6)) pass through the lower tank 12 and terminate in the upper tank 11. The associated stand pipes 27 extend through the body 19. The lower tank 12 is divided by a vertical diaphragm 134 into a centre core part 135 and an outer annular part 136.

The annular region 16 of the lower tank 12 is extended inside the upper tank 11 by tubes 137 containing pump vessels 138 carried by ring flanges 126 seam welded to the body 129 of the upper tank 11. The pump vessels 138 are in connection with the centre part 15 of the lower tank 12 through pipes 139 passing through the vertical diaphragm 134 and with the outer annular part 136 of the lower tank 12 through open ended pipes 140.

Figure 26:
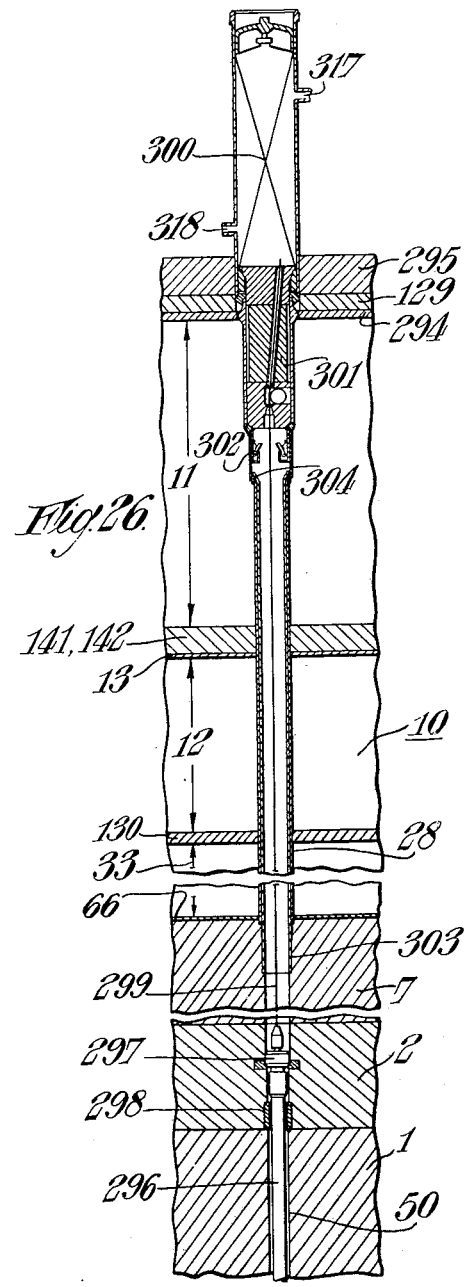
FIG. 26 is a sectional elevation showing a control rod tube in detail.

Thermal insulation is provided on the diaphragm 13 comprising alternate layers 141, 142 of hexagonal and diamond shaped steel tiles (see FIG. 14). The upper ends of the tubes 76 contained within the upper tank 11 are fitted with concentric thermally insulating sleeves 143, 144, 145. The control rod tubes 28 pass through the upper tank 11 and the lower tank 12, the tubes 28 being welded to the body 129, the diaphragm 13 and the body 130 where they pass through them. The tubes 76 are also welded to the diaphragm 13 and the body 130 where they pass through them. The control rod tubes 28 are also provided with the sleeves 143, 144, 145 and the tubes 137 are provided with sleeve 147. The body 129 of the upper tank 11 is thermally insulated by internal layers of thin steel plate 294 (FIG. 26) and covered by an external layer of conventional thermal insulation 295 (FIG. 26).

A girder grid 148 in the lower tank 12 is a part of a box grid structure 149 to form a beam to strengthen the tank. The upper tank 11 contains a perforated baffle plate 146. Each stub pipe 76 has holes 150 (one only of the pipes 76 being shown thus equipped, for clarity) and contains one of the tubes 86 (not shown here for clarity but see FIGS. 6, 16, 17 and 18).

The diaphragm 124 is continued through the upper tank 11 in the form of a vertical perforated ring plate 151 which is continued above the body 129 in the form of a flanged vertical support ring 152. The diaphragm 124 is also continued below the body 130 in the form of a core vessel 153.

Each pump 17 has an impeller 154 driven via a shaft 155 and seals 156 from a driving shaft 157, each pump vessel 138 being provided with coolant overflow pipes 158 and nitrogen bleed pipes 159.

Each heat exchanger 18 comprises a shell 162 between top and bottom tube plates 163, 164. The shell 162 houses tubes 165 spanning between the tube plates 163, 164. The lower end of the shell 162 is surrounded by a cylindrical vessel 166 welded at its upper open end to the body 130. A circular plate 167 closes the top end of the shell 162. A bell-shaped flange 168 is welded to the shell 162 and ports 169 in the shell 162 are provided. Eight equispaced pipes 170 pass through the plates 167, 163 to terminate with their lower open ends in the region of the plate 164. A central pipe 171 passes through the plate 167 to terminate at its lower open end in the plate 163. The upper open end of the pipe 171 forms the outlet 128 and connects with the pipes 40 (FIG. 1). The upper parts of the pipes 170 are coiled and surrounded by a tubular vessel 172 welded to the body 129. The vessel 172 supports a header vessel 173 into which pass the upper ends of the pipes 170. The header 173 has an inlet pipe 174 connecting with the pipe 19 (FIG. 1), and the pipe 171 passes through, and is welded to the header 173. A snout-ended tube 175 closed at its upper end is provided in the shell 162 directly below the tube 171. The tube 175 passes through the plate 164 and has a flared lower end 176 welded to the vessel 166. A bleed pipe 177 is provided from the centre part 135 of the lower tank 12 to the space 178 between the vertical side 132 of the diaphragm 13 and the body 130 of the lower tank 12.

The tank 10 is provided with a leak jacket 179 and there are eight of the heat exchangers 18, eight of the pumps 17, four hot traps 180 (see FIG. 13), four thermal syphon heat exchangers 181, all equispaced, and structural members 182 are provided.

Each hot trap 180 comprises a central tube 183 closed at its lower end and housing a heating element 184. The tube 183 at its top end passes through and is secured to the body 129. An annular vessel 185, closed at its lower end, surrounds the tube 183 and contains zirconium chippings 186. The vessel 185 is surrounded by a tube 187 and a support vessel 188 welded to the diaphragm 13 surrounds the tube 187. The outer wall of the vessel 185 has a flared end 189, the vessel 188 has ports 190, 191, 192, and baffles 193, 194 and passageways 127 are provided.

The tank 10 contains the liquid sodium coolant for the cooling of the fuel elements in the reactor. The upper tank 11 contains hot liquid sodium, the centre part 135 of the lower tank 12 contains cool liquid sodium at high pressure and the annular part 136 of the lower tank 12 contains cool liquid sodium at low pressure. The sodium in the annular part 136 of the lower tank 12 is drawn by the pumps 17 through the pipes 140 to the impellers 154 which deliver cool liquid sodium at high pressure to the centre core part 135 of the lower tank 12 through the pipes 139. The sodium then enters the holes 150, flows down the spaces between the outside of the tubes 86 and the inside of the tubes 76 into the reactor core; then up through the tubes 86. Heat is removed from the reactor core. The hot sodium discharges from the tubes 86 above the tops of the tubes 76 into the upper tank 11, the level of the hot liquid sodium in the upper tank 11 being indicated at 195. Nitrogen is bled into the pumps 17 and hence into the upper tank 11 through the pipes 159 to provide a nitrogen blanket over the hot liquid sodium in the upper tank 11, suitable vents being provided to prevent the nitrogen pressure from rising to an excessive value.

The hot sodium in the upper tank 11 flows under the flanges 168 of the heat exchangers 18, as shown by arrows 196, through the ports 169 and down through the tubes 165. Cool secondary sodium coolant flows down the pipes 170 from the inlet 174 and header 173 and leaves the pipes 170, as shown by arrows 197, to flow upwardly in the spaces between the tubes 165, i.e. in counter-current flow to the hot sodium in the tubes 165. The sodium in the tubes is cooled by heat exchange with the secondary sodium coolant which then flows up through the pipe 171, as shown by arrows 198 to the outlet 128. The liquid sodium in the tubes 165, now cooled, flows up the space between the shell 162 and the vessel 166, as shown by arrows 199, to enter the annular part 136 of the lower tank 12, as shown by arrows 122.

Cold liquid sodium passes from the centre part 135 of the lower tank 12 through the bleed pipes 177 to prevent stagnation of sodium in the space 178. Approximately ½% of the hot sodium in the upper tank 11 passes through each of the hot traps 180. The hot sodium passes under the flared end 189, as shown by arrows 123, down the space between the outer wall of the vessel 185 and the inner wall of the tube 187 and through the ports 191 to flow upwardly through the ports 192, as shown by arrows 124, and up through the space between the tube 183 and the inner wall of the vessel 185 where it is heated by the element 184. The liquid sodium then flows down over the zirconium chippings 186 and having been heated, any sodium oxide present reacts with the zirconium and is thus removed from the circulating sodium. The sodium continues downwardly, as shown by arrows 125, and then flows through the passageways 127, and upwardly through the space between the outer wall of the tube 187 and the inner wall of the vessel 188, as shown by arrows 200, giving up heat to the counter-current flowing sodium (arrows 123) to finally discharge into the annular part 136 of the lower tank 12 through the ports 190.

The underflow arrangement of the heat exchanger flange 168 minimizes vortexing of the hot liquid sodium and the baffle 146 minimizes surface agitation of the liquid sodium in the upper tank 11, thus avoiding gas entrainment in the sodium.

The arrangement of the tubes 76 and standpipes 27 strengthens the centre part 135 of the lower tank 12, helping to counteract the tendency of the body 130 and the diaphragm 13 to be pressed apart due to the pressure difference between the sodium in the centre part 135 of the lower tank 12 and the upper tank 11.

The arrangement of the pumps 17, the heat exchangers 18, the hot traps 180 and the thermal syphon heat exchangers 181 all extending into the annular part 136 of the lower tank 12 has merit in that it helps reduce the overall height of the tank 10 and avoids ducting which normally gives rise to expansion problems.

The reactor vessel is charged with sodium from a stock tank by means of gas pressure and an electro magnetic pump. When the primary sodium circuit has been fully charged a section of pipe line is removed and sealed to prevent accidental spillage of sodium. Sodium is circulated through the primary circuit and by-passed through cold traps comprising to reduce the initial oxygen content. The cold traps are then isolated and subsequently the oxygen is reduced to a tolerable level by the hot traps 180. Should it be necessary to empty the primary circuit the removable section of the pipe line is replaced and sodium ejected by gas pressure and the electro magnetic pump to the stock tank which is shielded and of sufficient capacity to contain all the sodium.

*The servicing machine 22 connection to standpipes 27, sodium inlet valve gear and sequence of refuelling operation*

The servicing machine 22 is shown schematically in FIG. 14. It comprises a massive body 201 with extended heat transfer surfaces 202 supported on the rotatable wheel 23, and has a fuel element storage magazine 203, fuel element storage chamber 204, a motor 205 for rotating the magazine 203, a fan 209 for circulating nitrogen and an upper body part 206 housing a rack 207 carrying a plunger 208.

The storage chamber 204 can be partially closed at its lower end by a sliding fuel element support 215 having a central orifice 216. A fuel element assembly 210 is shown in outline in the storage chamber 4. It carries a sliding block 247 to seal off the chamber 4. A duct 217 connects with a passageway 218 formed by a hollow shaft 219 movable in a ball bearing 220 and a journal bearing 221. The shaft 219 takes the drive to the magazine 203 from the motor 205 via a gear box 222. The hollow shaft 219 contains orifices 223 leading into a chamber 224 having an inlet 225 connected to the fan 209. A plate 232 having a hole 233 supports the fan 209, and lies above a base plate 234 having a hole 235. A sealing sleeve 214 seals the fuel element chamber 204 with a closed cavity defined by the upper body part 206 and partitions such as 211 and 213.

The plunger 208 carries a grab 212 at its lower end, and its upper end is screwed to a car 226 having wheels 227 arranged to run on the rack 207. The car 226 is held in position on the rack 207 by a cord 228 which passes round the top and bottom of the rack 207 on the pulleys 229 and over pulleys 230 and driving and tension wheel 231. A gamma ray shield 236 lies over the fan, motor etc. The wheel 23 strengthened by girders 244, moves on roller bearing 242 running on a track 241 on the massive circular shield 24 which completes the gamma shielding above the reactor. A mercury seal 243 forms a continuous gas seal. The shield 24, sealed to the extended biological shield 6 by mercury seals 25 moves on roller bearings 245 running on a track 246 embedded in the biological shield. The mercury seals 25, 243 prevent oxygen leaking in past the bearings 245 or sodium vapour leaking out. The machine 22 and the movement of the wheel 23 and shield 24 are controlled from a panel 248 which can be reached by a ladder 249.

Referring now also to FIGS. 15 and 16 the wheel 23 carries a lower extension piece 237 having an extendable standpipe attachment 238 carrying jaws 239 on pivot pins 241. A slide 240 (FIG. 14) is provided to open a passageway between the body 201 and the attachment 238 for movement of fuel elements etc. into and out of the body, or to close off the body from the attachment 238 when coolant gas is circulating in the body. Inside the attachment 238 and coaxial with it is a sealing tube 281 fitted at its lower end 282 with a sealing ring 283 which engages knife edges 284 on the upper face of each of the reactor standpipes 27. The standpipe 27 has an external flange 286 which is engaged by pawls 287 on the jaws 239 at the same time as the sealing tube 281 engages the knife edges 284. Movement of the jaws 239 is controlled by springs 288 acting on the attachment 238 and adjusting nuts 289, and by rollers 250, housed in the jaws 239 and riding on the flared outer surface of the end 282 of the tube 281. The standpipe 27 is shown without its end cap 285 (which is shown in position in FIG. 16) and a tube 251 normally housed in the fuel element storage magazine 203 is shown in position for operating sodium inlet shut-off valve 252 (see FIG. 17) and flow control valve 274 (see FIG. 18). The lower end of the tube 251 is splined and engages a splined sleeve 253 which also has outer splines 254 engaging a spring housing 255 and inner splines 256 engaging a collar 257 screwed to the upper end of the valve tube 86. The tube 86 is supported in the housing 255 by a spring 258. A bearing ring 260 holds the splined sleeve 253 in position against the action of a return spring 259 and a retaining ring 261 locates the housing 255 in the standpipe 27. The splined sleeve 253 and housing 255 have screw threads 290, 291, respectively. The end cap 255 has a screwed thread 292 and engages screw threads 262 in the stand pipe 27 so as to bear on a soft metal joint 263 through a plate 264 and a round-headed peg 265, joined to the cap 255 at a weld 266 and fixed in a socket 267 in the plate 264 by a screwed collar 268 having splines 269. The cap 255 is tightened by engaging splines 270 projecting from a central boss 271 on the top of the cap 255. The boss has a central holes 272 with a cut-away part 273 which can accept an expanding tool for lifting and lowering the cap 245.

The intermediate part of the valve tube 86 (between FIG. 16 and FIG. 6) is shown in FIGS. 17 and 18. This part of the tube passes through the header tank 10 and contains the sodium inlet valve 252 and flow control valve 274 (FIG. 18). The sodium inlet hole 150 in the lower tank 12 and a sodium outlet hole 275 in the upper tank 11 are also shown (FIGS. 18 and 17 respectively) together with the reactor standpipe 27, tank diaphragm 13 and thermal insulation tiles 141, 142 in FIG. 17 and in FIG. 18, the flange 98 and locknut 99 forming part of the upper mechanical joint 81 between the thimble tubes 14 and the stub pipes 76. The shut-off valve 252 comprises a valve member 276 which seats on the locknut 99. The flow control valve 274 comprises a valve member 277 with a cutaway part 278 sealed in the stub pipe 76 by piston rings 279 so as to be free to rotate and close off the inlet 150 either partially or completely.

To operate the valves 252 and 274 the attachment 238 on the servicing machine 22 is brought over the appropriate reactor standpipe 27 by rotation of the wheel 23 and shield 24. The slide 240 is operated to open the passageway between the body 201 of the servicing machine and the attachment 238 and the sealing tube 282 is lowered from the storage magazine 203, connected with the standpipe 27 and a seal made between the knife edges 284 and the tube 282 by rotating the tube. The seal cap 255 is then removed to the storage magazine 203 and the valve operating tube 251 inserted so that its splines engage the splined sleeve 253. To regulate the flow of coolant sodium through the inlet 150 the sleeve 253 is depressed by pressing on the valve operating tube 251 until the outer splines 254 on the sleeve 253 are just disengaged from the spring housing 255. The sleeve 253 is then rotated and by engagement of its inner splines 256 with the collar 257 on the valve tube 86 rotates the valve tube 86 so as to alter the position of the valve member 277 and its cutaway part 278 relative to the inlet 150. When the required position of the valve member 277 is reached pressure on the valve operating tube 251 is relieved and the splined sleeve 253 returns to its original position in engagement with the housing 255 under the action of the spring 259. In this position accidental rotation of the sleeve to open or close the valve 274 is prevented.

In order to operate the shut-off valve 274 the splined sleeve 253 is depressed by the valve operating tube 251 until the screw threads 280 on the sleeve engage the screw threads 281 on the housing 255. The sleeve 253 is then rotated and its downward movement in the screw threads 281 transferred to the valve tube 86 so that the valve member 276 seats firmly on the lock nut 99. With the valve 252 in this position coolant flow through the annulus between the tube 86 and stub pipe 76 is prevented and upward flow is also prevented by the piston rings 279. It is thus possible to isolate a channel through the reactor core (and carry out servicing operations). The servicing operation of discharging fuel elements will now be described with reference to FIG. 14 and FIGS. 19 to 25 inclusive. (FIGS. 19 to 25 are diagrammatic and show only parts already identified by the same reference numerals in earlier figures.)

FIG. 19 shows a fuel element channel 50 prepared for discharge. The connection has been made between the sealing tube 251 and the standpipe 27. The storage chamber 204 in the machine 22 is empty. The fuel element storage chamber 204 is opened by removing the fuel element support 215 and operating the sliding block 247 and the rack 207 carrying the car 226 is inserted into the chamber 204 (see FIG. 20). The plunger 8 is then brought down through the attachment 238 and tube 86 so that the grab 212 can engage a fuel element 210 (FIG. 21). With the grab 212 engaging the fuel element 210 the plunger 208 is raised so as to bring the fuel element 210 to a position of low neutron flux as shown in FIG. 22. The fuel element remains in this position for several hours until the fission product heat has reduced sufficiently for the gas cooling provided by the servicing machine to be effective. During the cooling period the sodium flow-rate is reduced by operating the valve 274 in the manner described above. When cooling is complete the fan 209 is switched on and forces nitrogen gas through the inlet 225 of the chamber 224, through the orifices 223, down the passageway 218, through the duct 217 into the chamber 204, into a channel lying between the magazine 203 and the massive body 201, over the extended surfaces 202, up over the top of the magazine 203 and through the orifices 235 and 233 back to the fan 209 (see FIG. 14). The path of the gas is indicated by arrows 293 in FIGS. 23 and 24. The plunger 8 is then raised to carry the fuel element 210 with it into the chamber 4 (FIG. 24). The support member 215 is slid under the element 210 and the grab 212 is disconnected. The rack 207 and the car 226 are taken back to their original positions, the sliding seal 214 is placed in position across the chamber and the slide valve 240 is closed. Thereafter gas-cooling is continued for about one hour while a fresh fuel element is charged into the channel 50, coolant flow is restored, the seal cap 285 is replaced to seal the standpipe 27 and the machine 22 is disconnected. The charging operation is similar to that described for discharging except that no cooling time is needed.

Fuel elements are discharged from the servicing machine 22 through the channel 29 to the underground duct 30 as described in relation to FIG. 1. The fuel elements are then transported underground to a handling and storage building where they are allowed to cool in a nitrogen atmosphere before being transported off the site or reorientated and returned to the reactor by the route followed for discharging. New fuel elements are placed direct in the servicing machine from the top face of the reactor.

*The control rods, control rod tubes 28 and control rod lifting mechanism*

FIG. 26 shows a control rod 296 fully inserted in one of the channels 50 passing through the reactor core 1 and reflector 2. Also shown is one of the control rod tubes 28 which extends from the top neutron shield cover plate 66, through the gas space 33 and the sodium header tank 10. The control tube 28 is welded to the body 130 of the lower tank 12, the body 129 of the upper tank 11 and the diaphragm 13. The heat insulation 141, 142 is shown diagrammatically; the sleeves 143, 144 and 145 (FIGS. 10 and 11) and the leak tray 85 (FIG. 6) are not shown for the sake of clarity, but the thin steel plate 294 and thermal insulation 295, mentioned in the description of the sodium header tank 10, are included. The control rod 16 has at its top end a broach 297 which engages with a broaching sleeve 298 to arrest the control rod 296 when it is dropped into the core 1 for emergency reactor shut-down. The control rod 296 is normally raised or lowered via a cable 299 passing through a shield plug 301 in the tube 28 and driven by a mechanism 300. The mechanism 300 comprises conventional components such as described in British Patents 817,999 and 832,694, and is cooled by nitrogen gas passing through inlet 317 and outlet 318. A catch 302 is provided to support the control rod 296 when fully withdrawn.

The tube 28 has a liner 303 of boron steel extending from the neutron shield 7 to a point just below the shield plug 301. The liner 303 is removable from the tube 28 and has a flanged top end 304 to locate it therein.

Neutrons escaping into the tube 28 are mostly fast neutrons and are mostly collimated. They therefore strike the liner 303 at low angle of incidence and if they proceed into the tube they traverse a borated path much greater than the liner thickness and they are therefore more likely to be absorbed. Those that reflect from the wall tend to keep in the path of collimation and arrive at the plug 301 where they are absorbed.

The liner 303 is made removable into the servicing machine 22 as it becomes activated to an extent which would hinder access to other parts of the tanks etc.

The assembly of control rod 296 and mechanism 300 may be withdrawn from the core 1 into the control rod coffin 26 shown diagrammatically in FIG. 27. The coffin 26 houses in an extended part 304 a lifting mechanism 305 comprising a rack 306, a car 307 running on the rack 306 and a plunger 308, finishing in a grab 309, fixed to the car 307. The car is held in position by a cable 310 passing round pulleys 311 and a driving wheel 312. Sliding seals 313 and 314 are provided to seal off the main body part of the coffin 26. A valve 315 is also provided. Connection between the tube 28 and the coffin 26 is made by an attachment 316 similar to that shown in FIG. 15 and the assembly is withdrawn from the reactor by operation of the grab 309.

*Plant flowsheet*

FIG. 28 is a typical plant flowsheet. It includes:

(a) The primary sodium circuit
(b) The secondary sodium circuit
(c) The power plant circuit
(d) The moderator cooling circuit
(e) The thermal siphon circuit The primary circuit which has been described in relation to FIGS. 10 to 13 is completely contained in the reactor vessel 4, the sodium, which becomes highly radioactive, being sealed at all times from the outside atmosphere by two solid barriers with a nitrogen gas barrier between them. All sodium stock tanks, drain tanks and others, and the nitrogen gas systems associated with the primary circuits are contained below the charge face of the reactor in a nitrogen atmosphere. The pumps 17, heat exchangers 18 and hot traps 180 are connected in parallel so that the effect of the loss of any unit would be shared over the whole reactor and need not necessitate a shut-down.

The secondary (inactive) sodium circuit is associated with copper bonded (bridge fin) and shell-and-tube heat exchangers 321 located outside the containment sphere 21 to transfer heat from the sodium of the secondary circuit to the power plant circuit; this requires heat transfer from sodium to water. Eight secondary sodium circuits are provided and are charged from a sodium stock tank. A mechanical sodium pump 322 is included at the highest point in each secondary sodium circuit and is built into a free-level header tank (not shown) which absorbs changes in sodium volume. A cold trap (not shown) is provided in a by pass round each pump 322 to reduce oxygen contamination. Each circuit is completely independent, allowing any one to be shut down for maintenance.

Primary and secondary sodium pumps are matched and controlled by steam load. The temperature of the primary sodium at the outlet of the reactor is pegged (at 525° C.) by the control rods. The temperature of the primary sodium at the inlet of the reactor is pegged (at 335° C.) by trimming pump speeds.

The heat generated in the moderator structure is removed by nitrogen as described in relation to FIGS. 2 to 5 and transferred in the moderator heat exchange 34 to a sodium-potassium circuit as described in relation to FIG. 28. This in turn through a pump 323 transfers the moderator heat to a low-pressure feed-water heater 343 in the power plant circuit.

The thermal siphon circuit is designed to remove the shut down heat from the reactor in the event of complete failure of the primary and secondary circuit pumps. The shut-down heat would be transferred to the thermal siphon liquid-metal circuit in a heat exchanger 344 in series with the primary heat exchangers 18. This circuit would reject the heat to atmosphere in an air cooled heat exchanger 324 in the base of a chimney 325. Under normal conditions the mean temperature difference in the heat exchangers is small so that the heat loss to the chimney 325 is small.

In the power plant circuit there are feed pumps 326 drawing water from a stock tank 327 and delivering it to a preheater or economiser section 328 of the secondary heat exchangers 321 in which the water is heated. The heated water is fed from the economiser 328 to the water storage space of a steam drum 329 and a circulating pump 330 draws the heated water from the drum 329 to the evaporator section 331 of the heat exchangers 321. Steam is raised in the evaporator section 331 and fed to the steam storage space of the drum 329. The steam is then taken to the super-heater section 332 of the heat exchanger 321 and the superheated steam is taken to a high pressure turbine 333 where the steam is used to generate electricity in a turbo-alternator 334. Steam leaving the high pressure turbine 333 is fed to the reheater section 335 of the heat exchanger 321 and then to an intermediate pressure turbine 336 which is also connected with the turbo-alternator 334. From the intermediate pressure turbine 336 steam is fed to a low pressure turbine 337 in line with the intermediate pressure turbine 336 and is discharged to a condenser 338 having surfaces cooled by water which is circulated through a cooling tower 339 by a pump 340. Extraction pumps 341 pump water from the condenser 338 into feed-water heaters 343 in parallel, one heater being connected to the moderator cooling circuit and the others being connected to the discharge side of the low pressure turbine 337 through a bleed pipe 342 which feeds into the condenser 338. The feed water heaters supply the stock tank 327.

We claim:

In combination with the reacting core of a nuclear reactor cooled by a liquid coolant, a unitary storage, circulating and heat exchange device for said coolant comprising a tank above the core; a heat insulated diaphragm dividing the tank into upper and lower compartments; a diaphragm dividing the lower compartment into a center core part and an outer annular part; a pump comprising a casing and an impeller supported in the tank, said casing being integral with the tank and said impeller being withdrawable from the casing from above the tank, a duct connecting the inlet side of the pump with the outer annular part of the tank and a duct connecting the outlet side of the pump with the core part of the tank; a heat exchanger comprising a shell and tubes supported in the tank, said shell being integral with the tank and said tubes being withdrawable from the shell from above the tank, means defining an opening connecting the inlet side of the heat exchanger with the upper compartment of the tank and means defining an opening connecting the outlet side of the shell with the outer annular part of the tank; vertical tubes extending into the core having their bottom ends closed and their top ends connecting with the core part of the tank for coolant flow into the core; and open ended vertical tubes extending from the upper compartment of the tank coaxial with and inside said vertical tubes with closed bottom ends for coolant flow out from the core.

References Cited in the file of this patent

UNITED STATES PATENTS

| | | |
|---|---|---|
| 2,830,944 | Wigner et al. | Apr. 15, 1958 |
| 2,841,545 | Zinn | July 1, 1958 |

OTHER REFERENCES

Proceedings of the International Conference on the Peaceful Uses of Atomic Energy, Vol. II, held in Geneva Aug. 8–20, 1955, New York, United Nations (1956), pages 338, 345.